United States Patent
Li et al.

(10) Patent No.: US 11,503,657 B2
(45) Date of Patent: Nov. 15, 2022

(54) METHOD AND APPARATUS FOR SIDELINK TRANSMISSION CONTROL

(71) Applicant: Telefonaktiebolaget LM Ericsson (publ), Stockholm (SE)

(72) Inventors: Yunxi Li, Järfälla (SE); Ricardo Blasco Serrano, Espoo (FI); Stefano Sorrentino, Solna (SE); Zhang Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 50 days.

(21) Appl. No.: 17/111,227

(22) Filed: Dec. 3, 2020

(65) Prior Publication Data

US 2021/0120611 A1 Apr. 22, 2021

Related U.S. Application Data

(63) Continuation of application No. 16/316,715, filed as application No. PCT/CN2018/073396 on Jan. 19, 2018, now Pat. No. 10,880,938.

(30) Foreign Application Priority Data

Feb. 20, 2017 (WO) ................ PCT/CN2017/074175

(51) Int. Cl.
*H04W 76/15* (2018.01)
*H04W 72/12* (2009.01)
(Continued)

(52) U.S. Cl.
CPC ......... *H04W 76/15* (2018.02); *H04W 72/121* (2013.01); *H04W 74/02* (2013.01); *H04W 76/14* (2018.02); *H04W 88/06* (2013.01)

(58) Field of Classification Search
None
See application file for complete search history.

(56) References Cited

U.S. PATENT DOCUMENTS 9,769,644 B2 * 9/2017 He ..................... H04W 72/02
10,405,332 B2 * 9/2019 Papasakellariou .... H04W 16/14
(Continued)

FOREIGN PATENT DOCUMENTS

WO 2016013538 A1 1/2016
WO 2016107244 A1 7/2016
(Continued)

OTHER PUBLICATIONS

Author Unknown, "5G Automotive Vision," 5G-PPP White Paper, Oct. 20, 2015, available at https://5g-ppp.eu/wp-content/uploads/2014/02/5G-PPP-White-Paper-on-Automotive-Vertical-Sectors.pdf, 67 pages.
(Continued)

*Primary Examiner* — Hong S Cho
(74) *Attorney, Agent, or Firm* — Christopher & Weisberg, P.A.

(57) ABSTRACT

Embodiments of the present disclosure provide a method, apparatus and computer program product for sidelink transmission control. The method implemented at a first user equipment which supports a first radio access technology comprises: determining a sidelink transmission mode for transmitting, wherein the sidelink transmission mode is one of a first mode corresponding to the first radio access technology and a second mode corresponding to a second radio access technology; and transmitting a sidelink signal according to the sidelink transmission mode using a sidelink resource configured by a network node which serves the first user equipment.

20 Claims, 4 Drawing Sheets

(51) Int. Cl.
*H04W 74/02* (2009.01)
*H04W 76/14* (2018.01)
*H04W 88/06* (2009.01)

(56) References Cited

U.S. PATENT DOCUMENTS

| | | | | |
|---|---|---|---|---|
| 10,660,146 | B2* | 5/2020 | Li | ............... H04W 76/14 |
| 2013/0287012 | A1 | 10/2013 | Pragada et al. | |
| 2016/0044707 | A1* | 2/2016 | Folke | ............ H04W 28/0278 |
| | | | | 370/329 |
| 2016/0295624 | A1 | 10/2016 | Novlan et al. | |
| 2016/0338095 | A1* | 11/2016 | Faurie | ............ H04W 72/1278 |
| 2019/0320475 | A1 | 10/2019 | Li et al. | |
| 2020/0076722 | A1* | 3/2020 | Kim | ............... H04W 76/16 |

FOREIGN PATENT DOCUMENTS

| | | |
|---|---|---|
| WO | 2016117940 A1 | 7/2016 |
| WO | 2017011039 A1 | 1/2017 |
| WO | WO-2017189035 A1 * | 11/2017 |
| WO | 2018149265 A1 | 8/2018 |

OTHER PUBLICATIONS

Author Unknown, "Technical Specification Group Services and System Aspects; Study on enhancement of 3GPP Support for 5G V2X Services (Release 15)," Technical Report 22.886, Version 2.0.0, Dec. 2016, 3GPP Organizational Partners, 57 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Technical Specification 36.300, Version 14.0.0, 3GPP Organizational Partners, Sep. 2016, 314 pages.
Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.1.0, Dec. 2016, 3GPP Organizational Partners, 654 pages.
LG Electronics Inc., "RP-161650: Discussion on eV2X requirements," Third Generation Partnership Project (3GPP), TSG-RAN#73, Sep. 19-22, 2016, 3 pages, New Orleans, USA.
LG Electronics Inc., "RP-161651: Discussion on eV2X in 5G RAN," Third Generation Partnership Project (3GPP), TSG RAN #73, Sep. 19-22, 2016, 9 pages, New Orleans, USA.
MCC Support, "R1-163406: Final Report of 3GPP TSG RAN WG1 #84 v2.0.0 (St. Julian's, Malta, Feb. 15-19, 2016)," Third Generation Partnership Project (3GPP), TSG RAN WG1 Meeting #84bis, Apr. 11-15, 2016, 128 pages, Busan, South Korea.
MCC Support, "R1-166056: Final Report of 3GPP TSG RAN WG1 #85 v1.0.0 (Nanjing, China, May 23-27, 2016)," Third Generation Partnership Project (3GPP), TSG RAN WG1 Meeting #86, Aug. 22-26, 2016, 170 pages, Göteborg, Sweden.
MCC Support, "R1-1608562: Final Report of 3GPP TSG RAN WG1 #86 v1.0.0 (Gothenburg, Sweden, Aug. 22-26, 2016)," Third Generation Partnership Project (3GPP), TSG RAN WG1 Meeting #86bis, Oct. 10-14, 2016, 154 pages, Lisbon, Portugal.
NTT Docomo, "RP-160671: New SID Proposal: Study on New Radio Access Technology," Third Generation Partnership Project (3GPP), TSG RAN Meeting #71, Mar. 7-10, 2016, 8 pages, Goteborg, Sweden.
LG Electronics Mobile Research, "S1-170250: Discussion on interworking aspect for different 3GPP RATs for eV2X," 3GPP TSG-SA WG1 #76-bis, Jan. 16-20, 2017, 3 pages, Spokane, Washington.
Non-Final Office Action for U.S. Appl. No. 16/316,715, dated Mar. 2, 2020, 8 pages.
Final Office Action for U.S. Appl. No. 16/316,715, dated Jun. 15, 2020, 9 pages.
Notice of Allowance for U.S. Appl. No. 16/316,715, dated Aug. 18, 2020, 8 pages.
Office Action for Bangladeshi Patent Application No. 48/2018, dated Aug. 7, 2019, 1 page.
Extended European Search Report for European Patent Application No. 18754169.3, dated Oct. 23, 2019, 10 pages.
Examination Report for Indian Patent Application No. 201837047531, dated Jul. 24, 2020, 6 pages.
Notification of Reason for Refusal for Korean Patent Application No. 10-2019-7024292, dated Oct. 7, 2020, 12 pages.
Search Report for Japanese Patent Application No. 2019-543932, available online dated Nov. 11, 2020, 42 pages.
Notice of Reasons for Refusal for Japanese Patent Application No. 2019-543932, dated Dec. 15, 2020, 13 pages.
International Search Report and Written Opinion for International Patent Application No. PCT/CN2018/073396, dated Mar. 29, 2018, 10 pages.

* cited by examiner

METHOD AND APPARATUS FOR SIDELINK TRANSMISSION CONTROL

This application is a continuation of U.S. patent application Ser. No. 16/316,715, filed on Jan. 10, 2019, which is a 35 U.S.C. § 371 national phase filing of International Application No. PCT/CN2018/073396, filed Jan. 19, 2018, which claims the benefit of International Application No. PCT/CN2017/074175, filed Feb. 20, 2017, the disclosures of which are incorporated herein by reference in their entireties.

TECHNICAL FIELD

The present disclosure relates generally to wireless access technology, and in particular, to a method, apparatus and computer program product for sidelink transmission control.

BACKGROUND

I. V2X (Vehicle-to-Anything-You-can-Image) Communication

V2X communication includes any combination of direct communication between vehicles, pedestrians and infrastructure. V2x communication may take advantage of a network infrastructure, when available, but at least basic V2X connectivity should be possible even in case of lack of coverage. Providing an LTE-based V2X interface may be economically advantageous because of the LTE economies of scale, and may enable tighter integration between communications with the network infrastructure (vehicle-to-infrastructure, V2I) and V2P (vehicle-to-pedestrian) communications and V2V (vehicle-to-vehicle) communications, as compared to using a dedicated V2x technology.

V2x communications may carry both non-safety and safety information, where each of the applications and services may be associated with specific requirements sets, e.g., in terms of latency, reliability, capacity, etc.

II. Sidelink Operation

Sidelink transmissions (also known as device-to-device (D2D) or proximity service (ProSe) transmissions) over so-called PC5 interface in cellular spectrum have been standardized in 3GPP specifications. In 3GPP specifications, two different operation modes have been specified for the sidelink transmissions. In one operation mode Mode-1, user equipment (UE) in RRC_CONNECTED mode may request D2D resources and eNB may grant the resources via downlink control information (DCIS) on physical downlink control channel (PDCCH) or via dedicated signaling messages. In another operation mode Mode-2, the UE may autonomously select resources for transmission from a pool of available resources. The resources are provided by the eNB in broadcast via SIB (system information block) signaling message for transmissions on carriers other than primary cell (PCell) or via dedicated signaling messages for transmission on the PCell. Therefore, unlike the operation mode Mode-1, the operation mode Mode-2 can be performed by the UE in RRC_IDLE mode.

The usage of the sidelink transmission is extended to the V2X communication. The design of sidelink physical layer in 3GPP specifications has been dictated by under assumptions of few amount of UEs competing for the same physical resources in the spectrum to carry voice packets for MCPTT (mission-critical push to talk) traffic and low-mobility. On the other hand, in V2x communication the sidelink transmission should be able to cope with higher load scenario (e.g. hundreds of cars could potentially contend the physical resources) to carry time/event triggered V2x messages (e.g. cooperative awareness message (CAM), decentralized environment notification message (DENM)) and high mobility. For such reasons, it is necessary to enhance the sidelink physical layer. In particular, two new operation modes have been introduced: mode-3 which includes sidelink semi persistent scheduling (SL SPS) and dynamic sidelink grant a-lá mode-1, and mode-4 which corresponds to UE autonomous resource selection a-lá mode-2 with some enhancements. Such enhancements include a so-called sensing procedure in which the UE is required to sense the channel for at least a certain time-frame before selecting the proper resources.

III. Sidelink Control Information (SCI) Format 1

SCI format 1 is used for the scheduling of PSSCH (physical sidelink shared channel) in LTE network. The following information is transmitted by means of the SCI format 1:

Priority,
Resource reservation,
Frequency resource location of initial transmission and retransmission,
Time gap between initial transmission and retransmission,
Modulation and coding scheme,
Retransmission index, and
Reserved information bits, currently set to zero.

IV. MAC Header for LTE Sidelink Shared Channel (SL-SCH)

The MAC header for LTE sidelink SL-SCH is of variable size and consists of the following fields:

V: MAC PDU format version number field indicating which version of the SL-SCH subheader is used, SRC: source Layer-2 ID field carrying an identity of a source, which is set to ProSe UE ID obtained from an upper layer, DST: destination Layer-2 ID for V2X sidelink transmission, which is set to an identifier provided by an upper layer.

LCID: logical channel ID field uniquely identifying a logical channel instance, and there is one LCID field for each MAC PDU or padding included in the MAC PDU, L: length field indicating the length of the corresponding MAC PDU in bytes, F: format field indicating the size of the Length field, E: extension field which is a flag indicating if more fields are present in the MAC header or not, R: reserved bit, currently set to 0.

V. User Plane PDCP (Packet Data Convergence Protocol) Data PDU for LTE Sidelink Radio Bearer (SLRB)

FIG. 1 shows the format of the PDCP Data PDU for SLRB used for one-to-many communication. The SDU type, i.e. Layer-3 Protocol Data Unit type, contains the following fields, as shown in Table 1. The SDU type includes 1 reserved bit.

TABLE 1

| Bit | Description |
|---|---|
| 000 | IP |
| 001 | ARP |
| 010 | PC5 Signaling |
| 011 | Non-IP |
| 100-111 | Reserved |

VI. New Radio (NR) Access Technology

NR access technology aims to meet a broad range of use cases including enhanced mobile broadband, massive MTC (machine type communication), critical MTC, and additional requirements. The numerology and frame structure for NR interfaces in NR network can be totally different from LTE network.

In the NR access technology, more than one values of subcarrier-spacing may be supported. Multiple CP (cyclic prefix) lengths may be defined for a given subcarrier spacing. The NR access technology defines the number of subcarriers per PRB (physical resource block) and a subframe duration is defined by duration of x OFDM symbols given a reference numerology.

Current sidelink transmission is LTE based. The LTE based sidelink transmission has same radio frame structure with LTE.

With NR technology being standardized, it can be expected that NR based sidelink transmission, which has same radio frame structure with NR, e.g. with different subcarrier spacing with LTE (e.g., 3.75 kHz) will be standardized. This NR based sidelink transmission can achieve better performance than the LTE based sidelink transmission, e.g. better resource utilization, shorter latency and etc. Besides, the radio protocols, e.g. MAC and PDCP layer for NR based sidelink transmission may also be different from that used for LTE based sidelink transmission. Therefore a legacy LTE UE may not be able to receive sidelink transmission using NR.

It can be expected that LTE system and NR system will coexist for rather long time after NR system starts deployment, for both Uu and sidelink. Legacy LTE eNBs may only implement support for controlling LTE based sidelink transmission. For cost and complexity reasons it may not be possible/desirable to upgrade the legacy LTE eNBs to equip them with NR functionalities.

As a result, when a NR capable UE (i.e. the UE supporting NR access technology) camped/connected to a legacy LTE eNB intends to perform sidelink operation, or when a NR capable UE has ongoing NR based LTE move into LTE network (via cell reselection or handover), based on current solution, the NR capable UE has to either give up the sidelink operation or fallback to LTE sidelink operation. If the NR capable UE can fall back to LTE sidelink operation, the NR capable UE will perform the LTE based sidelink transmission instead of NR based sidelink transmission, which will lead to lower performance compared with the NR based sidelink transmission. Also, it may lead to communication failure with UE supporting NR based sidelink transmission but not supporting LTE based sidelink transmission. If the NR capable UE cannot fall back to LTE sidelink operation, which is possible, as the NR technology may not provide backwards compatibility towards LTE, the NR capable UE has to give up the sidelink operation, which leads to service interruption.

On the other hand, the NR capable UE camped/connected to a NR eNB may always be requested to transmit sidelink using NR based technology, which may make its communication failure with the legacy LTE UE supporting LTE based sidelink transmission only.

SUMMARY

It is therefore an object of embodiments of the present disclosure to provide a sidelink transmission control mechanism which enables the UE can implement the sidelink transmission across different radio access technologies (RATs).

According to a first aspect of the disclosure, there is provided a method implemented at a first UE which supports a first radio access technology. In the method, a sidelink transmission mode for transmitting is determined, wherein the sidelink transmission mode is one of a first mode corresponding to the first radio access technology and a second mode corresponding to a second radio access technology. Then, a sidelink signal is transmitted according to the sidelink transmission mode using a sidelink resource configured by a network node which serves the first UE. In some embodiments, the first radio access technology is backward compatible with the second radio access technology.

In some embodiments, in the determining of a sidelink transmission mode, firstly a sidelink signal from other sidelink transmissions is detected. Then it is determined which sidelink transmission mode is used for the other sidelink transmissions. In response that any of the other sidelink transmissions uses the second mode, the sidelink transmission mode is determined as the second mode. In response that all of the other sidelink transmissions use the first mode, the sidelink transmission mode is determined as the first mode.

In some embodiments, in the determining of a sidelink transmission mode, firstly it is determined which radio access technology is supported by at least one second UE in proximity. In response that any of the at least one second UE supports the second radio access technology, the sidelink transmission mode is determined as the second mode. In response that all of the at least one second UE support the first radio access technology, the sidelink transmission mode is determined as the first mode.

In some embodiments, the determination of the radio access technology supported by at least one second UE is based on capability information of the at least one second UE which has been obtained by the first UE.

In some embodiments, the first UE stores the capability information associated with identification of the at least one second UE.

In some embodiments, the capability information is obtained from a sidelink signal previously transmitted by the at least one second UE.

In some embodiments, the capability information is received in a signaling message transmitted from the network node which supports the first radio access technology.

In some embodiments, the sidelink transmission mode is determined based on pre-configuration of the first mode or the second mode for the first UE.

In some embodiments, the sidelink transmission mode is determined based on a transmission requirement for the sidelink transmission.

In some embodiments, the sidelink transmission mode is determined based on a resource configuration dedicated to the first mode or the second mode for the first UE.

In some embodiments, the network node supports the second radio access technology. In response to the determination of the sidelink transmission mode as the first mode, the first UE adapts configuration of the sidelink resource for the first mode and transmits a sidelink signal using the adapted sidelink resource according to the first mode. In response to the determination of the sidelink transmission mode as the second mode, the first UE transmits the sidelink signal using the sidelink resource according to the second mode.

In some embodiments, the first UE is configured with a first sidelink resource for the first mode and a second sidelink resource for the second mode. In response to the determination of the sidelink transmission mode as the first mode, the first UE transmits the sidelink signal using the first sidelink resource according to the first mode. In response to the determination of the sidelink transmission mode as the second mode, the first UE transmits the sidelink signal using the second sidelink resource according to the second mode.

In some embodiments, the first UE is configured with a sidelink resource within which a part of parameters are assigned with a first value for the first mode and a second value for the second mode and other parameters are assigned with a value common to the first and second modes. In response to the determination of the sidelink transmission mode as the first mode, the first UE transmits the sidelink signal within the sidelink resource using the corresponding parameters for the first mode according to the first mode. In response to the determination of the sidelink transmission mode as the second mode, the first UE transmits the sidelink signal within the sidelink resource using the corresponding parameters for the second mode according to the second mode.

In some embodiments, the first UE further transmits additional signals to span the sidelink resource.

In some embodiments, the first UE determines which sidelink transmission mode is to be used for receiving. Then the first UE receives a sidelink signal using the determined sidelink transmission mode.

In some embodiments, the first UE receives a second sidelink signal, and decodes the received second sidelink signal using the first mode and the second mode respectively. In response to the received second sidelink signal is successfully decoded using the first mode, the first UE determines the first mode is to be used for receiving. In response to the received second sidelink signal is successfully decoded using the second mode, the first UE determines the second mode is to be used for receiving.

In some embodiments, the first UE is configured with a receiving resource, a first transmission resource for the first mode and a second transmission resource for the second mode, the receiving resource covering the first and second transmission resource. The first UE detects whether a second sidelink signal is received using the first mode or the second mode within the first transmission resource. In response to the detection of the receipt of the second sidelink signal, the first UE determines the first mode or the second mode is to be used within the first transmission resource for receiving. The first UE detects whether the second sidelink signal is received using the first mode or the second mode within the second transmission resource. In response to the detection of the receipt of the second sidelink signal, the first UE determines the first mode or the second mode is to be used within the second transmission resource for receiving. The first UE detects whether the second sidelink signal is received using the first mode or the second mode within the remaining of the receiving resource. In response to the detection of the receipt of the second sidelink signal, the first UE determines the first mode or the second mode is to be used within the remaining of the receiving resource for receiving.

In some embodiments, the first UE is configured with a first receiving resource for the first mode and a second receiving resource for the second mode. The first UE detects whether a second sidelink signal is received within the first receiving resource or within the second receiving source. In response to the detection that the second sidelink signal is received within the first receiving resource, the first UE determines the first mode is to be used for receiving. In response to the detection that the second sidelink signal is received within the first receiving resource, the first UE determines the first mode is to be used for receiving.

In some embodiments, the first radio access technology is NR access technology and the second radio access technology is LTE radio access technology, and wherein the first mode is NR based mode and the second mode is LTE based mode.

In some embodiments, the first radio access technology is LTE radio access technology and the second radio access technology is NR access technology, and wherein the first mode is LTE based mode and the second mode is NR based mode.

According to a second aspect of the disclosure, there is provided an apparatus in a user equipment which supports a first radio access technology. The apparatus comprises a processor and a memory, said memory containing instructions executable by said processor, whereby said apparatus is operative to: determine a sidelink transmission mode for transmitting, the sidelink transmission mode being one of a first mode corresponding to the first radio access technology and a second mode corresponding to a second radio access technology; and transmit a sidelink signal according to the sidelink transmission mode using a sidelink resource configured by a network node which serves the user equipment.

In some embodiments, the first radio access technology is backward compatible with the second radio access technology.

According to a third aspect of the disclosure, there is provided a computer readable storage medium having a computer program stored thereon. The computer program is executable by a processor to cause the processor to carry out the method for sidelink transmission control according to the first aspect of the disclosure.

According to a fourth aspect of the disclosure, there is provided a computer program product executable by a device to cause the device to carry out the method for sidelink transmission control according to the first aspect of the disclosure.

According to a fifth aspect of the disclosure, there is provide an apparatus in a user equipment which supports a first radio access technology. The apparatus comprise a determination module configured to determine a sidelink transmission mode for transmitting, wherein the sidelink transmission mode is one of a first mode corresponding to the first radio access technology and a second mode corresponding to a second radio access technology. The apparatus also comprises a transmitting module configured to transmit a sidelink signal according to the sidelink transmission mode using a sidelink resource configured by a network node which serves the user equipment.

According to the various aspects and embodiments as mentioned above, the UE can implement the sidelink transmission across different RATs. In particular, the UE supporting NR access technology (also referred to as "NR UE") can perform the NR based sidelink transmission in the LTE system, which can achieve comparable performance with that in the NR system. The UE supporting LTE radio access technology (also referred to as "LTE UE") can perform the LTE based sidelink transmission in the NR system.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

For illustrative purposes, several embodiments of the present disclosure will be described in the context of a New Radio (NR) system and a LTE network. Those skilled in the art will appreciate, however, that the concept and principle of the several embodiments of the present disclosure may be more generally applicable to other wireless networks.

The non-limiting and exemplary embodiments of the present disclosure relate to the sidelink transmission control across different RATs.

Figure 1:
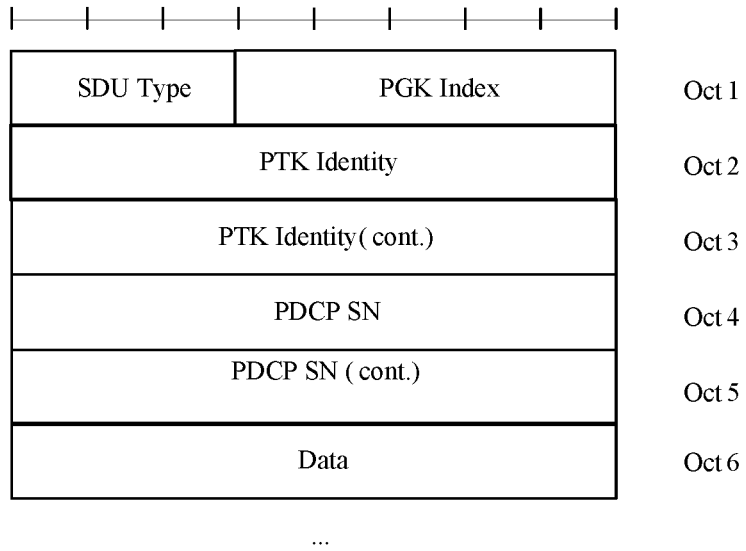
FIG. 1 is a diagram showing the format of the PDCP Data PDU for SLRB.
Figure 2:
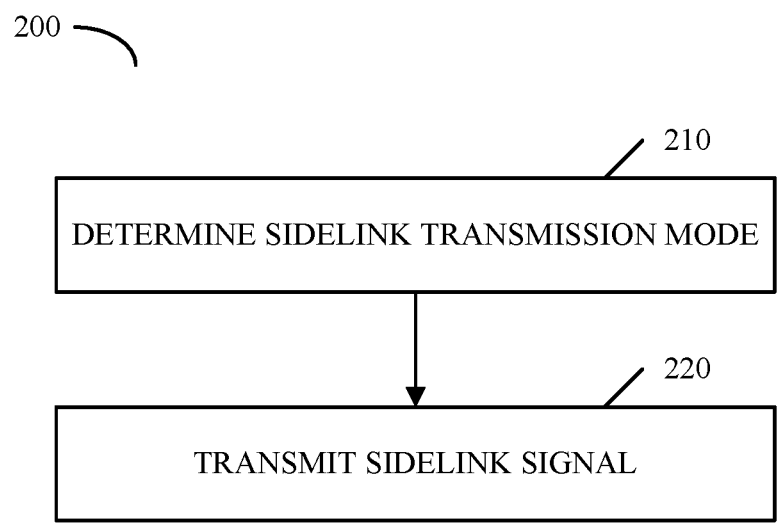
FIG. 2 is a flowchart illustrating the method for sidelink transmission control according to some embodiments of the present disclosure.

FIG. 2 shows a flowchart illustrating the method 200 for sidelink transmission control according to some embodiments of the disclosure. The method may be performed in the communication system to which two RATs (a first RAT and a second RAT) are applicable. In the communication system, some UEs may support the first RAT, and some UEs may support the second RAT. In some embodiments, the UE may be a radio terminal such as a mobile phone, a wearable device, a tablet, etc., a vehicle with radio communication functionality, or any other type of electronic device with radio communication functionality.

In the following description, the first RAT is backward compatible with the second RAT, that is, the first RAT is more advanced compared to the second RAT. As an example, the first RAT is NR access technology, and the second RAT is LTE radio access technology. For the sake of clarity and simplicity, the UE supporting the NR access technology is referred to as "NR UE".

As shown in FIG. 2, at block 210, the NR UE determines a sidelink transmission mode to be used for transmitting. In some embodiments, there are two sidelink transmission mode, i.e. NR based mode (which is an example of "a first mode") and LTE based mode (which is an example of "a second mode").

The determination of the sidelink transmission mode will be described in detail as follows.

In some embodiments, the NR UE may detect a sidelink signal from at least one other sidelink transmission using sensing protocols. Generally the sidelink transmission may use unicast communication, multicast communication, or broadcast communication. The NR UE may receive the sidelink signals destined for it and broadcast in its communication range. Then the NR UE may determine which sidelink transmission mode is used for these sidelink transmissions. If the NR UE determines any one of these other sidelink transmission uses the LTE based mode, the NR UE may determine its sidelink transmission mode as the LTE based mode. If the NR UE determines that the majority or all of these other sidelink transmissions use the NR based mode, the NR UE may determine its sidelink transmission mode as the NR based mode. This is because in the case of the broadcast communication, the NR UE needs to determine the sidelink transmission mode applicable for all the other UEs. A person skilled in the art will appreciate that, in some cases, e.g. the sidelink transmission carries non-safety information, it is enough for the NR UE to determine the sidelink transmission modes used by the majority of the other sidelink transmission.

Alternatively or additionally, in some embodiments, the NR UE may determine which radio access technology is supported by one or more second UEs in proximity. The second UE(s) may be UE(s) with which the NR UE will perform the sidelink transmission. This determination may be realized according to capability information of the second UE(s). The capability information may indicate the access capability of the UE, e.g. the radio access technology used by the UE.

In some embodiments, the NR UE may obtain the capability information from the sidelink signal previously transmitted by the second UE(s). For example, when the second UE transmits the sidelink signal using the LTE based sidelink transmission, the second UE may indicate its access capability in the sidelink signal. For example, the reserved bit in the LTE SCI, MAC header for LTE SL-SCH or PDCP header for LTE SLRB may be used for the capability information. The NR UE may store the capability information associated with the identification of the second UE. For another example, if the second UE transmits the sidelink signal using the NR based sidelink transmission, it indicates that the second UE supports the NR technology. The NR UE may detect Source Layer-2 ID/ProSe UE ID, and store the capability information of the second UE associated with the ID.

In addition, the capability information of the second UE(s) may be received in a common or dedicated signaling message from the NR eNB which serves the NR UE. This is especially useful if the serving/camping cell of the NR UE is the NR cell or eLTE cell while all the neighbor cells are NR cells and/or eLTE cells. The NR UE may report its capability to its NR eNB. Then the NR eNBs may exchange the capability information of the NR UE(s) and inform the served/camped NR UE(s) of the capability information. Further if the NR eNB detects that the neighbor cell is the NR cell, the NR eNB may inform its served/camped NR UE(s) of the capability information of other NR UE(s) in the neighbor NR cell.

In the case of the broadcast communication, upon the determination of the radio access technology of the second UE(s), if any second UE supports the LTE radio access technology, the NR UE determines the sidelink transmission mode as the LTE based mode. If the majority or all of the second UE(s) support the NR access technology, the NR UE determines the sidelink transmission mode as the NR based mode. In the case of the unicast communication and the multicast communication, the NR UE may determine its sidelink transmission according to the radio access technology supported by the destination UE(s).

In some embodiments, the NR UE may be preconfigured or predefined with the LTE based mode or the NR based mode. In such case, the NR UE determines its sidelink transmission mode as preconfigured or predefined.

In some embodiments, the NR UE may determine the sidelink transmission mode based on a transmission requirement on the sidelink transmission. The transmission requirement may be expressed in terms of some transmission parameters, e.g. QoS information such as priority level, broadcast mode (e.g. unicast, multicast, broadcast), destination address, transport format, or synchronization source, etc.

In some embodiments, the NR UE may determine the sidelink transmission mode based on a resource configuration dedicated to the NR based mode or the LTE based mode. If the NR UE is granted to use the resource dedicated to the LTE based mode or the NR based mode, the NR UE may determine the corresponding sidelink transmission mode according to the dedicated resources.

It should be noted that the above embodiments for determining the sidelink transmission mode may be implemented individually or in combination.

Returning to FIG. 2, upon the determination of the sidelink transmission mode, at block 220, the NR UE may transmit a sidelink signal using a sidelink resource configured by the network node serving the NR UE, e.g. eNB, according to the determined sidelink transmission mode.

In an embodiment, the sidelink resource is used by the NR UE for transmitting and receiving sidelink signals. As described above, the NR UE may obtain the sidelink resource in two ways. One is that the NR UE requests the sidelink resource and the eNB serving the NR UE grants the sidelink resource to the NR UE in response. The other is that the eNB broadcasts a pool of available resources and the NR UE autonomously selects the sidelink resource from the pool. The sidelink resource may be expressed by one or more resource pools in time and/or frequency and associated transmission parameters, e.g. maximum transmission power, modulation and coding scheme (MCS), number of retransmission, etc.

Figure 3:
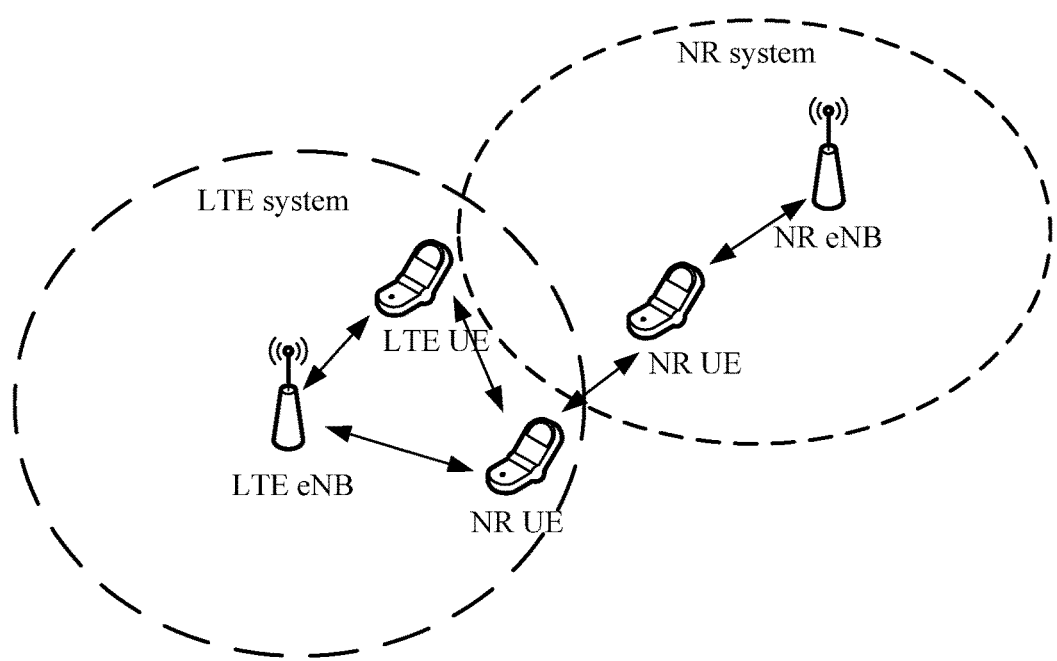
FIG. 3 is a diagram illustrating an example in which the method for sidelink transmission control according to some embodiments is implemented.

Next the detailed description of the NR UE transmitting the sidelink signal will be provided with reference to FIG. 3. In the example as shown in FIG. 3, the NR UE may be served by the LTE eNB or the NR eNB.

In the case of the LTE eNB, the LTE eNB grants/configures the sidelink resource for the LTE based mode only to the NR UE.

If it is determined that the NR UE uses the NR based mode to transmit, the NR UE may transmit the sidelink signal within the sidelink resource but not using LTE parameters (e.g. numerology). Firstly, the NR UE may adapt the configuration of the sidelink resource for the NR based sidelink transmission. In some embodiments, the NR UE may choose transmission parameters for the NR based sidelink transmission within limits of the transmission parameters for the LTE based sidelink transmission, for example, the maximum transmission power. For example, the NR eNB grants 1 PRB to the NR UE. For the LTE based sidelink transmission, 1 PRB corresponds to 12*15 kHZ (i.e. 180 kHz) subcarriers and 14 OFDM symbols (1 ms). Therefore the NR UE may adapt 1 PRB to correspond to 6*30 kHZ subcarriers and 28 OFDM symbols for the NR based sidelinks transmission. Then the NR UE may transmit the sidelink signal using the adapted sidelink resource.

If it is determined that the NR UE uses the LTE based mode to transmit, the NR UE may transmit the sidelink signal using the sidelink resource directly according to the LTE based mode.

In the case of the NR eNB serving the NR UE, in some embodiments, the NR eNB may configure/grant the sidelink resource for the NR based mode (hereinafter referred to as "NR resource") and/or the sidelink resource for the LTE based mode (hereinafter referred to as "LTE resource"). The NR resource may or may not overlap with the LTE resource. Alternatively, the NR resource may be identical to the LTE resource. In some other embodiments, the NR eNB may configure/grant the sidelink resource in which some parameters are assigned with NR dedicated value and LTE dedicated value and other parameters are assigned with common value. The assignment may be pool specific. For example, the NR eNB may configure different MCSs for the LTE based and NR based sidelink transmissions for a specific pool, while configuring common maximum transmission power for both.

It should be noted that the NR eNB grants the NR resource and the NR dedicated parameters only for the NR UE. The NR eNB may know it is serving the NR UE via a RRC message UECapabilityInformation from the NR UE indicating its NR access capability.

In the case where the NR eNB configures/grants the NR resource only, if it is determined that the NR UE uses the NR based mode, the NR UE may transmit the sidelink signal using the NR resource. If it is determined that the NR UE uses the LTE based mode, the NR UE may adapt the configuration of the NR resource for the LTE based mode. For example, the NR eNB may grant 1 PRB to the NR UE. The NR UE may adapt 1 PRB for the LTE based mode. Then the NR UE may transmit using the adapted resource.

In the case where the NR eNB configures/grants the LTE resource only, if it is determined that the NR UE uses the NR based mode, the NR UE may adapt the configuration of the LTE resource for the NR based mode. Then the NR UE may transmit the sidelink signal using the adapted resource. If it is determined that the NR UE uses the LTE based mode, the NR UE may transmit using the LTE resource.

In the case where the NR eNB configures/grants the LTE resource and the NR resource, if it is determined that the NR UE uses the NR based mode, the NR UE may transmit the sidelink signal using the NR resource. If it is determined that the NR UE uses the LTE based mode, the NR UE may transmit using the LTE resource.

Figure 4:
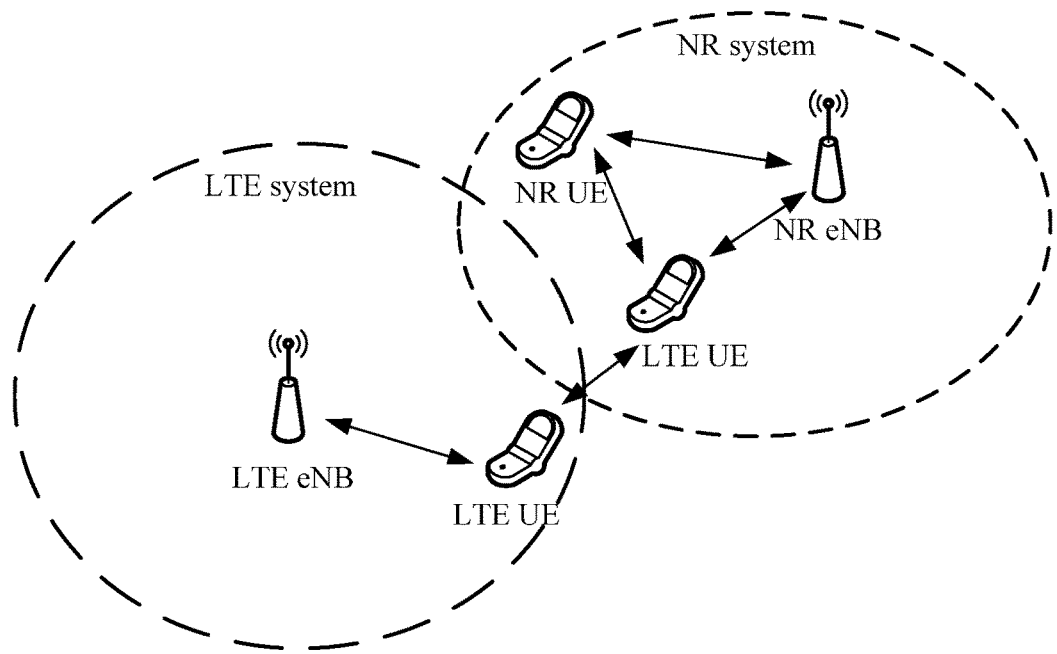
FIG. 4 is a diagram illustrating another example in which the method for sidelink transmission control according to some embodiments is implemented.

Although the first RAT is the NR access technology and the second RAT is the LTE radio access technology in the above embodiments, it will be appreciated that the first RAT may be the LTE radio access technology and the second RAT is the NR access technology in some embodiments. Next the description of the LTE UE transmitting the sidelink signal will be provided with reference to FIG. 4. In the example of FIG. 4, the LTE UE may be served by the NR eNB or the LTE eNB. In the case of the NR eNB, the NR eNB may configure/grant the NR resource and/or the LTE resource to the LTE UE.

As the LTE UE uses the LTE based mode only, the sidelink transmission mode of the LTE UE is determined as the LTE based mode. In the case where the NR eNB configure/grant the NR resource only, the LTE UE may adapt the configuration of the NR resource for the LTE based mode. Then the LTE UE may transmit the sidelink signal using the adapted resource. In the case where the NR eNB configure/grant the LTE resource, the LTE UE may transmit the sidelink signal using the LTE resource.

In the case of the LTE eNB serving the LTE UE, the LTE eNB configures/grants the sidelink resource for the LTE based mode only to the LTE UE. Therefore the LTE UE may transmit the sidelink signal using the sidelink resource directly.

In addition, the NR UE may use a part of the sidelink resource to transmit the sidelink signal. Thus the sidelink resource is not spanned. In this case, the NR UE may further transmit additional signals to completely span the sidelink resource, so that all of the sidelink resource may be used. The additional signal may be noise signal, padding signal, or any other signal.

Figure 5:
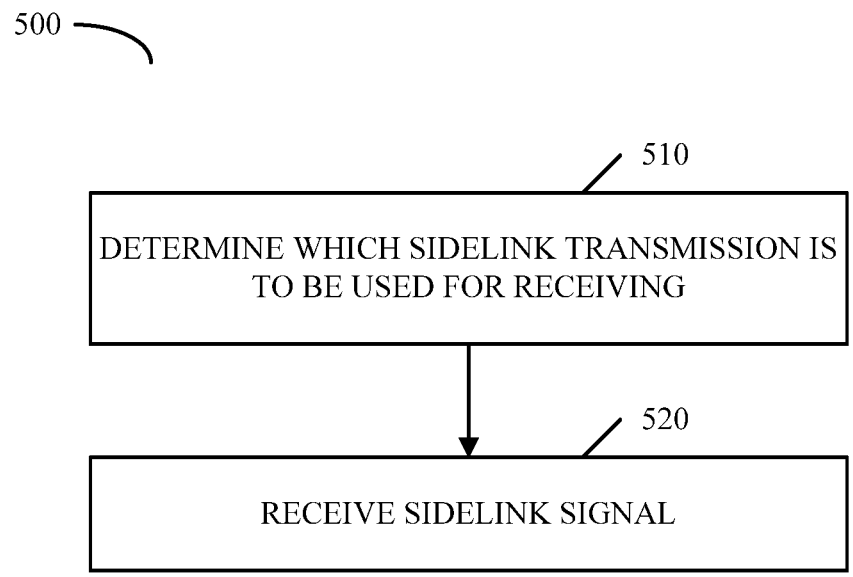
FIG. 5 is a flowchart illustrating the method for sidelink transmission control according to some embodiments of the present disclosure.

FIG. 5 shows a flow chart illustrating the method 500 for sidelink transmission control according to some embodiments of the disclosure, in particular, the method as shown in FIG. 5 relates to a receiving process for the sidelink transmission. The method may be performed by the UE supporting a first RAT.

In some embodiments, the first RAT is more advanced than the second RAT. In the following description, as an example, the first RAT is the NR access technology, and the second RAT is the LTE radio access technology.

As shown in FIG. 5, at block 510, the NR UE may determine which sidelink transmission mode is to be used for receiving. As described above, the sidelink transmission mode may be one of the NR based mode and the LTE based mode.

In an embodiment, the determination may be realized by performing blind detecting. Specifically, the NR UE receives a sidelink signal. Then the NR UE decodes the received sidelink signal using the NR based mode and the LTE based mode respectively. It may include de-modulation, de-puncturing, decoding, descrambling, and CRC (cyclic redundancy check) checking. If the CRC checking corresponding to NR succeeds, it indicates that the received sidelink signal is successfully decoded using the NR based mode. Accordingly it is determined that the NR based mode is to be used for receiving. If the CRC checking corresponding to LTE succeeds, it indicates that the received sidelink signal is successfully decoded using the LTE based mode. Accordingly it is determined that the LTE based mode is to be used for receiving.

In another embodiment, the NR UE may be configured with a receiving resource, a NR transmission resource for the NR based mode and a LTE transmission resource for the LTE based mode. The receiving resource, the NR transmission resource and the LTE transmission resource constitute the sidelink resource. The receiving resource may cover the NR and LTE transmission resources. In this case, the NR UE may detect the receipt of the sidelink signal within the NR transmission resource, the LTE transmission resource and the remaining of the receiving resource respectively using the NR based mode and the LTE based mode. Then the NR UE may determine the NR based mode or the LTE based mode is to be used for receiving within the respective resources according to the detection result.

Specifically, if the NR UE detects that the sidelink signal is received within the NR transmission resource using the NR based mode, the NR UE may determine that the NR based mode is to be used for receiving within the NR transmission resource. If the NR UE detects that the sidelink signal is received within the NR transmission resource using the LTE based mode, the NR UE may determine that the LTE based mode is to be used for receiving within the NR transmission resource.

If the NR UE detects that the sidelink signal is received within the LTE transmission resource using the NR based mode, the NR UE may determine that the NR based mode is to be used for receiving within the LTE transmission resource. If the NR UE detects that the sidelink signal is received within the LTE transmission resource using the LTE based mode, the NR UE may determine that the LTE based mode is to be used for receiving within the LTE transmission.

If the NR UE detects that the sidelink signal is received within the remaining of the receiving resource using the NR based mode, the NR UE may determine that the NR based mode is to be used for receiving within the remaining of the receiving resource. If the NR UE detects that the sidelink signal is received within the remaining of the receiving resource using the LTE based mode, the NR UE may determine that the LTE based mode is to be used for receiving within the remaining of the receiving resource.

In still another embodiment, the NR UE is configured with a NR receiving resource for the NR based mode and a LTE receiving resource for the LTE based mode. The NR receiving resource and the LTE receiving resource constitute the sidelink resource. In this case, the NR UE may detect whether the sidelink signal is received within the NR receiving resource or within the LTE receiving resource. If the NR UE detects that the sidelink signal is received within the NR receiving resource, the NR UE may determine the NR based mode is to be used for receiving. If the NR UE detects that the sidelink signal is received within the LTE receiving resource, the NR UE may determine the LTE based mode is to be used for receiving.

Then at block 520, the NR UE may receive the subsequent sidelink signals using the determined sidelink transmission mode.

In some other embodiments, the first RAT may be the LTE radio access technology, and the second RAT may be the NR access technology.

In addition, a person skilled in the art will appreciate that the method as shown in FIG. 5 may be combined with the method as shown in FIG. 2.

It can be seen from the above description that the method for sidelink transmission control according to the above embodiments can implement the sidelink transmission across different RATs. In particular, the method enables the NR UE to perform the NR based mode in the LTE system. Further, the method enables the NR UE to determine proper sidelink transmission mode, so that the NR UE may communicate with both the LTE UE and the NR UE. In addition, the method also enables the LTE UE to communicate with both the LTE UE and the NR UE.

Although the NR access technology and the LTE radio access technology are employed in the above embodiments, a person skilled in the art will appreciate that any other radio access technology may be applicable. It will be conceivable that the method for sidelink transmission control according to those embodiments may be applied to two arbitrary radio access technologies.

Figure 6:
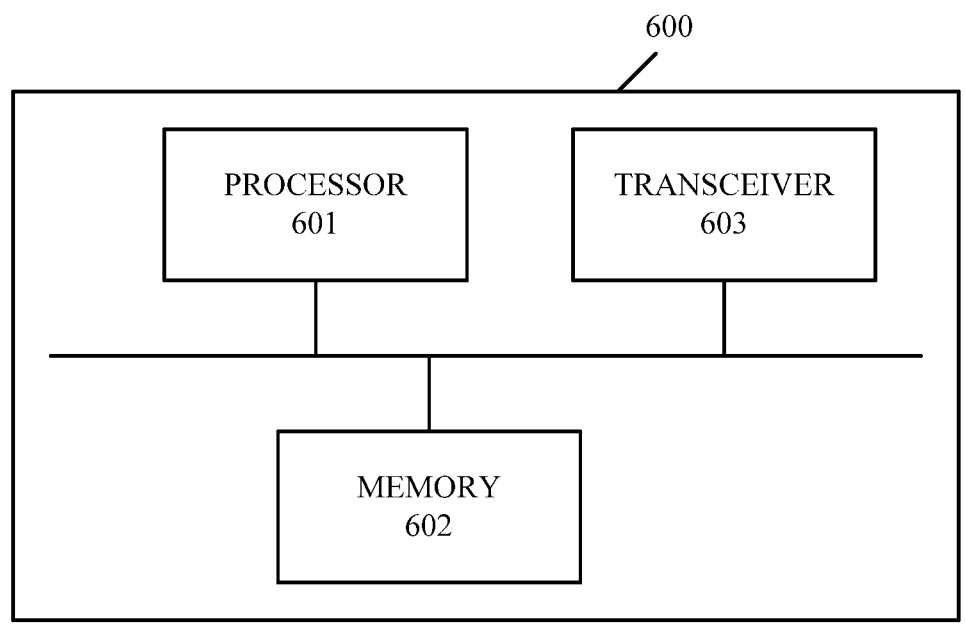
FIG. 6 is a schematic block diagram of an apparatus in a user equipment according to some embodiments of the present disclosure.

FIG. 6 is a schematic block diagram of an apparatus 600 in a user equipment (UE) according to some embodiments of the present disclosure. The user equipment may be a mobile phone, a wearable device, a tablet, a vehicle with radio communication functionality, or any other electronic device with radio communication functionality. In some embodiments, the user equipment supports the first RAT. As shown in FIG. 6, the apparatus 600 may comprise a processor 601 and a memory 602. The memory 602 may contain instructions executable by the processor 601. The apparatus 600 is operative to determine a sidelink transmission mode for transmitting, the sidelink transmission mode being one of a first mode corresponding to the first radio access technology and a second mode corresponding to a second radio access technology, and to transmit a sidelink signal to at least one second UE in proximity according to the sidelink transmission mode using a sidelink resource configured by a network node which serves the UE.

In some embodiments, the first RAT is more advanced compared to the second RAT. As an example, the first RAT may be NR access technology, and the second RAT may be LTE radio access technology. In addition, the first RAT may be the LTE radio access technology and the second RAT may be the NR access technology.

The processor 601 may be of any type suitable to the local technical environment, and may comprise one or more of general purpose computers, special purpose computers, microprocessors, digital signal processors (DSPs) and processors based on multi-core processor architectures, as non-limiting examples. The memory 602 may be of any type suitable to the local technical environment and may be implemented using any suitable data storage technology, such as semiconductor based memory devices, flash memory, magnetic memory devices and systems, optical memory devices and systems, fixed memory and removable memory.

In some embodiments, the apparatus 600 may be further operative to detect a sidelink signal from other sidelink transmissions, to determine which sidelink transmission mode is used for the other sidelink transmissions, to determine, in response that any of the other sidelink transmissions uses the second mode, the sidelink transmission mode as the second mode, and to determine, in response that all of the other sidelink transmissions use the first mode, the sidelink transmission mode as the first mode. This is because in the case of the broadcast communication, the NR UE needs to determine the sidelink transmission mode applicable for all the other UEs. A person skilled in the art will appreciate that, in some cases, e.g. the sidelink transmission carries non-safety information, it is enough for the NR UE to determine the sidelink transmission modes used by the majority of the other sidelink transmission.

In some embodiments, the apparatus 600 may be further operative to determine which radio access technology is supported by at least one second UE in proximity, to determine, in response that any of the at least one second UE supports the second radio access technology, the sidelink transmission mode as the second mode, and to determine, in response that all of the at least one second UE support the first radio access technology, the sidelink transmission mode as the first mode. This is because in the case of the broadcast communication, the user equipment 600 needs to determine the sidelink transmission mode applicable for all the other UEs. In the case of the unicast communication and the multicast communication, the user equipment 600 may determine its sidelink transmission according to the radio access technology supported by the destination UE(s).

In some embodiments, the network node may support the second radio access technology. The apparatus 600 is further operative to, in response to the determination of the sidelink transmission mode as the first mode, adapt configuration of the sidelink resource for the first mode and transmit a sidelink signal using the adapted sidelink resource according to the first mode, and in response to the determination of the sidelink transmission mode as the second mode, to transmit the sidelink signal using the sidelink resource according to the second mode.

In some embodiments, the user equipment may be configured with a first sidelink resource for the first mode and a second sidelink resource for the second mode. The apparatus 600 may be operative to transmit, in response to the determination of the sidelink transmission mode as the first mode, the sidelink signal using the first sidelink resource according to the first mode, and to transmit, in response to the determination of the sidelink transmission mode as the second mode, the sidelink signal using the second sidelink resource according to the second mode.

In some embodiments, the user equipment may be configured with a sidelink resource within which a part of parameters are assigned with a first value for the first mode and a second value for the second mode and other parameters are assigned with a value common to the first and second mode. The apparatus 600 may be further operative to transmit, in response to the determination of the sidelink transmission mode as the first mode, the sidelink signal within the sidelink resource using the corresponding parameters for the first mode according to the first mode, and to transmit, in response to the determination of the sidelink transmission mode as the second mode, the sidelink signal within the sidelink resource using the corresponding parameters for the second mode according to the second mode.

In some embodiments, the apparatus 600 may be further operative to determine which sidelink transmission mode is to be used for receiving a sidelink signal, and to receive the sidelink signal using the determined sidelink transmission mode.

Figure 7:
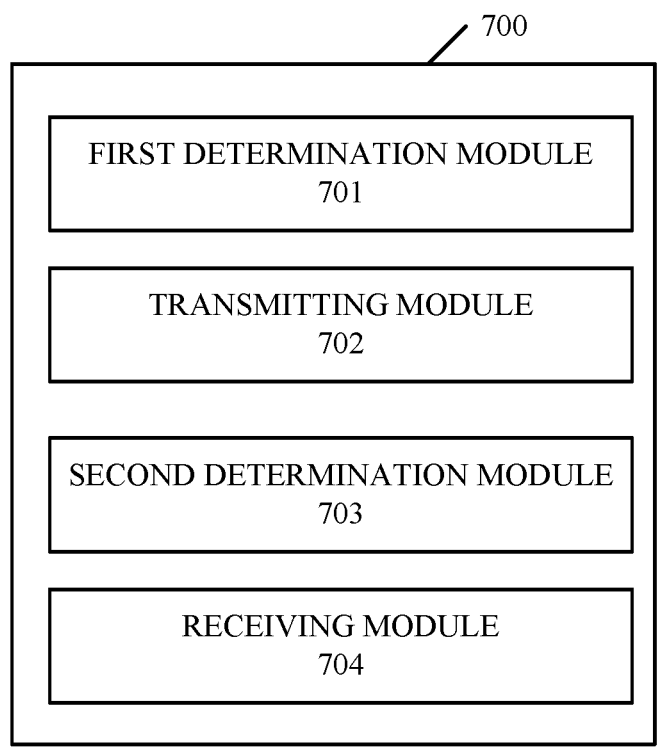
FIG. 7 is a schematic block diagram of an apparatus for sidelink transmission control according to some embodiments of the present disclosure.

FIG. 7 is a schematic block diagram of an apparatus 700 for sidelink transmission control according to some embodiments of the present disclosure. The apparatus 700 may be embodied in/as the UE supporting the first RAT. As shown in FIG. 7, the apparatus 700 may comprise a determination module 701 configured to determine a sidelink transmission mode for transmitting, wherein the sidelink transmission mode is one of a first mode corresponding to the first radio access technology and a second mode corresponding to a second radio access technology. The apparatus 700 also comprise a transmitting module 702 configured to transmit a sidelink signal according to the sidelink transmission mode using a sidelink resource configured by a network node which serves the UE.

It should be noted that FIG. 7 merely illustrates various functional modules in the apparatus 700, and a person skilled in the art can implement these functional modules in practice using any suitable software and hardware. Thus the embodiments herein are generally not limited to the shown structure of the apparatus 700 and functional modules.

In some embodiments of the present disclosure, there is also provided a computer readable storage medium having a computer program stored thereon. The computer program is executable by a processor to cause the processor to carry out the above methods for sidelink transmission control.

In some embodiments of the present disclosure, there is also provided a computer program product executable by a device to cause the device to carry out the methods for sidelink transmission control according to some embodiments of the present disclosure.

In general, the various exemplary embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure comprises any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a first New Radio (NR) user equipment (UE), which supports NR radio access technology comprising:
   determining a sidelink transmission mode for transmitting, the sidelink transmission mode being one of a first mode corresponding to the NR radio access technology and a second mode corresponding to Long Term Evolution (LTE), radio access technology by:
      determining which radio access technology is supported by at least one second UE in proximity;
      in response that any of the at least one second UE supports LTE radio access technology, determining the sidelink transmission mode as the second mode; and
      in response that all of the at least one second UE support the NR radio access technology, determining the sidelink transmission mode as the first mode;
   the first NR UE being configured with a sidelink resource within which a part of parameters are assigned with a first value for the first mode and a second value for the second mode and other parameters are assigned with a value common to the first and second modes, the assignment of the parameters being pool specific, and different modulation and coding schemes (MCSs) are configured for the LTE based and NR based sidelink transmissions for a specific pool, while common maximum transmission power is configured for both LTE based and NR based sidelink transmissions; and
   transmitting a sidelink signal according to the sidelink transmission mode using a sidelink resource configured by a network node which serves the first NR UE, transmitting the sidelink signal comprises:
      in response to the determination of the sidelink transmission mode as the first mode, transmitting the sidelink signal within the sidelink resource using the corresponding parameters for the first mode according to the first mode; and
      in response to the determination of the sidelink transmission mode as the second mode, transmitting the sidelink signal within the sidelink resource using the corresponding parameters for the second mode according to the second mode.

2. The method according to claim 1, wherein the determining a sidelink transmission mode comprises:
   detecting a sidelink signal from other sidelink transmissions;
   determining which sidelink transmission mode is used for the other sidelink transmissions;
   in response that any of the other sidelink transmissions uses the second mode, determining the sidelink transmission mode as the second mode; and
   in response that all of the other sidelink transmissions use the first mode, determining the sidelink transmission mode as the first mode.

3. The method according to claim 1, wherein the determination of the radio access technology supported by the at least one second UE is based on capability information of the at least one second UE which has been obtained by the first NR UE.

4. The method according to claim 1, wherein the sidelink transmission mode is determined based on pre-configuration of the first mode or the second mode for the first NR UE.

5. The method according to claim 1, wherein the sidelink transmission mode is determined based on a transmission requirement for the sidelink transmission.

6. The method according to claim 1, wherein the sidelink transmission mode is determined based on a resource configuration dedicated to the first mode or the second mode for the first NR UE.

7. The method according to claim 1, wherein the network node supports the second radio access technology;
   and wherein transmitting a sidelink signal comprises:
      in response to the determination of the sidelink transmission mode as the first mode,
         adapting configuration of the sidelink resource for the first mode; and
         transmitting a sidelink signal using the adapted sidelink resource according to the first mode; and in response to the determination of the sidelink transmission mode as the second mode, transmitting the sidelink signal using the sidelink resource according to the second mode.

8. The method according to claim 7, wherein the first NR UE further transmits additional signals to span the sidelink resource.

9. The method according to claim 1, wherein the first NR UE is configured with a first sidelink resource for the first mode and a second sidelink resource for the second mode; wherein transmitting a sidelink signal comprises:
in response to the determination of the sidelink transmission mode as the first mode, transmitting the sidelink signal using the first sidelink resource according to the first mode; and
in response to the determination of the sidelink transmission mode as the second mode, transmitting the sidelink signal using the second sidelink resource according to the second mode.

10. The method according to claim 1, further comprising:
determining which sidelink transmission mode is to be used for receiving; and
receiving a sidelink signal using the determined sidelink transmission mode.

11. An apparatus in a New Radio (NR), a user equipment (UE), which supports NR radio access technology comprising:
a processor; and
a memory, the memory containing instructions executable by said processor, the apparatus being operative to:
determine a sidelink transmission mode for transmitting, the sidelink transmission mode being one of a first mode corresponding to the NR radio access technology and a second mode corresponding to Long Term Evolution (LTE) radio access technology by being operative to:
determine which radio access technology is supported by at least one second UE in proximity;
in response that any of the at least one second UE supports the second radio access technology, determine the sidelink transmission mode as the second mode; and
in response that all of the at least one second UE support the first radio access technology, determine the sidelink transmission mode as the first mode; and
the first NR UE is configured with a sidelink resource within which a part of parameters are assigned with a first value for the first mode and a second value for the second mode and other parameters are assigned with a value common to the first and second modes, the assignment of the parameters being pool specific, and different modulation and coding schemes (MCSs) are configured for the LTE based and NR based sidelink transmissions for a specific pool, while common maximum transmission power is configured for both LTE based and NR based sidelink transmissions; and
transmit a sidelink signal according to the sidelink transmission mode using a sidelink resource configured by a network node which serves the UE, the apparatus being operative to transmit a sidelink signal by:
in response to the determination of the sidelink transmission mode as the first mode, transmitting the sidelink signal within the sidelink resource using the corresponding parameters for the first mode according to the first mode; and
in response to the determination of the sidelink transmission mode as the second mode, transmitting the sidelink signal within the sidelink resource using the corresponding parameters for the second mode according to the second mode.

12. The apparatus according to claim 11, wherein the apparatus is operative to determine a sidelink transmission mode by:
detecting a sidelink signal from other sidelink transmissions;
determining which sidelink transmission mode is used for the other sidelink transmissions;
in response that any of the other sidelink transmissions uses the second mode, determining the sidelink transmission mode as the second mode; and
in response that all of the other sidelink transmissions use the first mode, determining the sidelink transmission mode as the first mode.

13. The UE according to claim 11, wherein the apparatus is operative to determine which radio access technology is supported by at least one second UE in proximity based on a capability information of the at least one second UE which has been obtained by the first NR UE.

14. The apparatus according to claim 11, wherein the apparatus is operative to determine the sidelink transmission mode based on any of:
pre-configuration of the first mode or the second mode for the first NR UE;
a transmission requirement for the sidelink transmission; or
a resource configuration dedicated to the first mode or the second mode for the first NR UE.

15. The apparatus according to claim 11, wherein the network node supports the second radio access technology; and wherein the apparatus is operative to transmit a sidelink signal by:
in response to the determination of the sidelink transmission mode as the first mode,
adapting configuration of the sidelink resource for the first mode; and
transmitting a sidelink signal using the adapted sidelink resource according to the first mode; and
in response to the determination of the sidelink transmission mode as the second mode, transmitting the sidelink signal using the sidelink resource according to the second mode.

16. The apparatus according to claim 11, wherein the UE is configured with a first sidelink resource for the first mode and a second sidelink resource for the second mode;
wherein the apparatus is operative to transmit a sidelink signal by:
in response to the determination of the sidelink transmission mode as the first mode, transmitting the sidelink signal using the first sidelink resource according to the first mode; and
in response to the determination of the sidelink transmission mode as the second mode, transmitting the sidelink signal using the second sidelink resource according to the second mode.

17. The apparatus according to claim 11, wherein the apparatus is further operative to:
determine which sidelink transmission mode is to be used for receiving; and
receive a sidelink signal using the determined sidelink transmission mode.

18. The apparatus according to claim 17, wherein the apparatus is operative to determine which sidelink transmission mode is to be used for receiving by:
- receiving a second sidelink signal;
- decoding the received second sidelink signal using the first mode and the second mode respectively;
- in response to the received second sidelink signal is successfully decoded using the first mode, determining the first mode is to be used for receiving; and
- in response to the received second sidelink signal is successfully decoded using the second mode, determining the second mode is to be used for receiving.

19. The apparatus according to claim 17, wherein the first NR UE is configured with a receiving resource, a first transmission resource for the first mode and a second transmission resource for the second mode, the receiving resource covering the first and second transmission resource,
- and wherein the apparatus is operative to determine which sidelink transmission mode is to be used for receiving by:
  - detecting whether a second sidelink signal is received using the first mode or the second mode within the first transmission resource;
  - in response to the detection of the receipt of the second sidelink signal, determining the first mode or the second mode is to be used within the first transmission resource for receiving;
  - detecting whether the second sidelink signal is received using the first mode or the second mode within the second transmission resource;
  - in response to the detection of the receipt of the second sidelink signal, determining the first mode or the second mode is to be used within the second transmission resource for receiving;
  - detecting whether the sidelink signal is received using the first mode or the second mode within the remaining of the receiving resource; and
  - in response to the detection of the receipt of the second sidelink signal, determining the first mode or the second mode is to be used within the remaining of the receiving resource for receiving.

20. The apparatus according to claim 17, wherein the first NR UE is configured with a first receiving resource for the first mode and a second receiving resource for the second mode,
- and wherein the apparatus is operative to determine which sidelink transmission mode is to be used for receiving by:
  - detecting whether a second sidelink signal is received within the first receiving resource or the second receiving source;
  - in response to the detection that the second sidelink signal is received within the first receiving resource, determining the first mode is to be used for receiving; and
  - in response to the detection that the second sidelink signal is received within the first receiving resource, determining the first mode is to be used for receiving.

* * * * *